June 8, 1965     W. J. POWERS     3,187,742

COMBINATION GAS BURNER GRID AND FLAME SHIELD

Filed Dec. 14, 1962     2 Sheets-Sheet 1

INVENTOR.
WALTER J. POWERS
BY
ATTORNEY

June 8, 1965  W. J. POWERS  3,187,742
COMBINATION GAS BURNER GRID AND FLAME SHIELD
Filed Dec. 14, 1962  2 Sheets-Sheet 2

INVENTOR.
WALTER J. POWERS
BY
ATTORNEY

United States Patent Office 3,187,742
Patented June 8, 1965

3,187,742
COMBINATION GAS BURNER GRID AND
FLAME SHIELD
Walter J. Powers, 486 Genesee St., Rochester, N.Y.
Filed Dec. 14, 1962, Ser. No. 244,613
12 Claims. (Cl. 126—214)

This invention relates to a grid for supporting a pan or the like over a gas burner, and more particularly to a gas burner grid having means for shielding gas flames from the handle of the pan disposed on the grid.

Most conventional gas stoves comprise a plurality of gas burners, each of which has a grid positioned thereover for supporting a pot or pan. Each burner has a plurality of holes therethrough for directing gas flames upwardly through the grid. Moreover, many such burners are also provided with a plurality of circumferentially arranged openings which direct part of the gas flames radially outwardly to provide adequate heating over the bottom of a pot or pan. In any event, regardless of the specific disposition of the openings in a respective gas burner, at least part of the flames emitted therefrom generally flow radially outwardly along the bottom of the particular pan disposed on the grid, and then curl upwardly along the sides of the pan circumferentially thereabout.

A major disadvantage of prior burners is a tendency of the flame which curls upwardly along the sides of a pan to excessively heat or scorch the pan handle, which may result in severely burning a person grasping the handle. Moreover, such extreme heating of the pan handle may destroy the handle or weaken the connection between the handle and pan, thereby increasing the possibility of a severe burn to the person not only from the pan handle but from the thereby accidentally spilled contents of the pan.

An object of this invention is to provide an improved gas burner grid which will substantially eliminate any undesirable overheating of a pan handle, and any consequential injury to the person handling the pan.

Another object of the invention is to provide an improved gas burner grid of the type described which is relatively simple and economic in construction, and which will substantially eliminate accidents heretofore attributable to overheated pan handles.

A further object of this invention is to provide an improved gas burner grid which will shelter a pan handle from undersirable exposure to gas flames, thereby preventing fracture of the pan handle due to excessive overheating.

Other objects of this invention will be apparent hereinafter from the specification, and from the recital of the appended claims, particularly when read in conjunction with the accompanying drawings.

Figure 1:
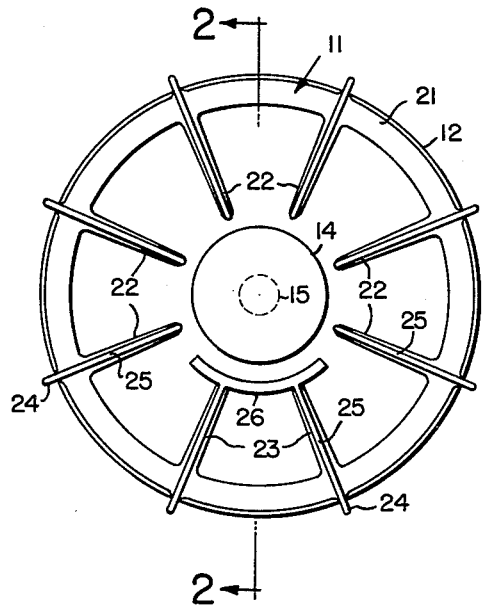
FIG. 1 is a plan view of a gas burner and grid therefor made in accordance with one embodiment of this invention.
Figure 2:
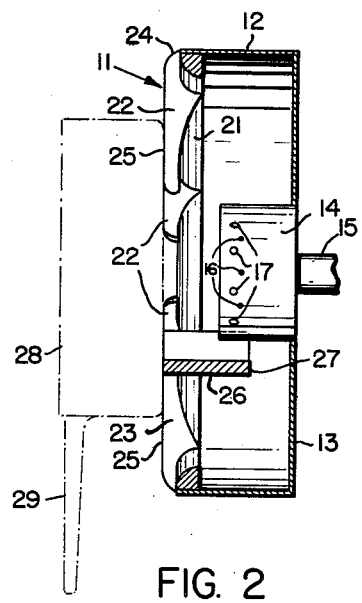
FIG. 2 is a vertical sectional view taken along the line 2—2 in FIG. 1 looking in the direction of the arrows, and showing in broken lines a pan supported on the burner grid.
Figure 3:
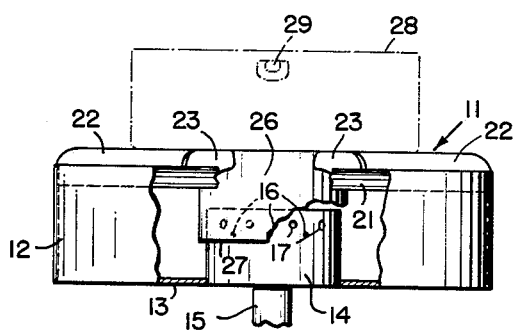
FIG. 3 is a front elevational view of this embodiment with part of the burner housing and flame shield being broken away, and with a pan shown in broken lines on the grid.

Referring now to the drawings by numerals of reference, and first to the embodiment illustrated in FIGS. 1 to 3, my novel gas burner grid 11 is adapted to be seated removably in the upper, open end of a stationary, generally cup-shaped housing 12 having a bottom 13 through the center of which projects a conventional gas stove burner 14, which is shown more or less diagrammatically. Burner 14 comprises a hollow cylinder into the lower end of which gas is fed by a pipe 15. The upper end of the burner is closed. Adjacent its upper end the annular wall of burner 14 has therethrough two, vertically spaced rows of circumferentially arranged openings 16 and 17, respectively, for directing gas flames radially outwardly. The diameter of the lower openings 16 are less than those of the upper openings 17 so that they project gas flames radially outwardly beneath and beyond the flames issuing from the openings 17.

As shown in FIGS. 1 to 3, the grid 11 comprises a rigid, cast-iron, ring or annulus 21 which fits into the open end of housing 12 coaxially thereof. Integral with the ring 21 are eight, equi-angularly spaced and radially arranged ribs, six of which are designated by the numerals 22 and are substantially equal in length, and project radially inwardly from ring 21 so that their radially innermost ends touch or are tangential to an imaginary circle the diameter of which is slightly larger than the outside diameter of the cylindrical burner 14. The two remaining ribs 23 are adjacent to one another, and are slightly shorter than ribs 22 so that their inner ends terminate short of the above-mentioned imaginary circle. Each of the ribs 22 and 23 has an integral tail portion 24 (FIG. 1) which is seated upon, and which projects slightly radially outwardly beyond, the upper edge of housing 12, thereby to support the grid 11 in the open end of the housing. The upper faces of the ribs 22 and 23 have flat, longitudinally extending and coplanar pan supporting surfaces 25.

Integral with or otherwise secured to the radial innermost ends of the two adjacent ribs 23 of the grid 11 is the outer, convex surface of a substantially rigid, arcuate shield 26. Shield 26 is preferably made of cast-iron or the like, and projects downwardly toward the bottom 13 of housing 12 with its concave inner face disposed in radially spaced concentric relation to the outer surface of the burner 14. Shield 26 has its upper edge coplanar with the upper surfaces 25 of the ribs 22 and 23, and its lower edge 27 (FIGS. 2 and 3) disposed sufficiently below the circumferentially disposed openings 16 and 17 of the burner so that the curtain of flame from the openings does not flow under the lower edge 27. Also, the arcuate length of shield 26 is such that the shield extends completely across the angular space between the two ribs 23 to which it is secured, and part way into the two angular spaces between these two ribs 23 and the two ribs 22 next adjacent thereto.

In use, the grid 11 is mounted in the open end of housing 12 in such manner that the shield 26 will be conveniently disposed relative to the front of the stove, so that a person may readily place a pot or pan 28 (broken lines in FIGS. 2 and 3) on grid 11 with its handle 29 above and in alignment with the shield 26. When gas from burner 14 is ignited, the flames issuing radially outwardly from the openings 16 and 17 opposite the shield 26 will impinge upon the inner, concave face of the shield and be deflected so as to minimize heating of the pan handle 29. Although shield 26 does not serve to insulate the pan handle 29 completely, it effectively eliminates the objectionable curling of the gas flames upwardly along the side of the pan in the vicinity of its handle 29 and thereby protects the handle from being overheated, scorched, or burned.

Figure 4:
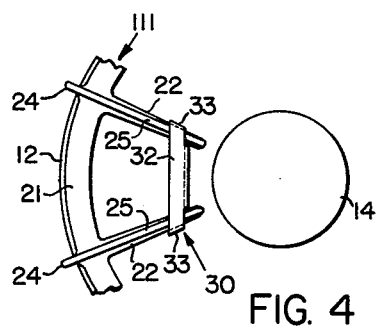
FIG. 4 is a fragmentary plan view of the gas burner and grid with a modified form of flame shield mounted on the grid.
Figure 5:
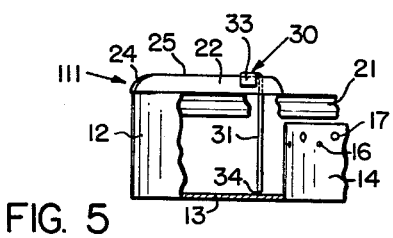
FIG. 5 is a fragmentary elevational view of the embodiment shown in FIG. 4.

A modified form of shield is illustrated at 30 in FIGS. 4 and 5, and is adapted to be employed with a grid 111 which is similar to grid 11 except that the ribs 23 and shield 26 are replaced by two ribs 22 of the type employed in FIGS. 1 to 3. As in the first embodiment, grid 111 is adapted to be employed with a housing 12 and burner 14. Shield 30 comprises a rectangularly shaped plate 31 of fire resistant sheet metal or the like, which is removably suspended between any two adjacent ribs 22 of the grid 111 by means of an outwardly-projecting flange 32 at its top. Flange 32 has an overall length greater than the distance between the opposite sides of plate 31, and the flange seats on the upper surfaces 25 of the pair of supporting ribs 22 between which the plate 31 is suspended. The terminal ends of the flange 32 are bent downwardly to define tabs 33 which engage the distal sides of the pair of supporting ribs 22 to prevent the shield from shifting sideways thereon. Plate 31 extends downwardly from its pair of supporting ribs 22 in a vertical plane, which is spaced from the peripheral surface of burner 14, so that its lower edge 34 engages the housing bottom 13. Also, the width of plate 31 is such that the plate completely spans the angular space between its respective supporting ribs 22, whereby flames issuing from the openings 16 and 17 opposite plate 31 will impinge against the plate instead of passing radially outwardly through the space between said supporting ribs. Should plate 31 become less rigid upon being heated, the engagement of its lower edge 34 with the housing bottom 13 prevents the plate from sagging or bending, so as to keep its upper edge level beneath a pot or pan.

Figure 6:
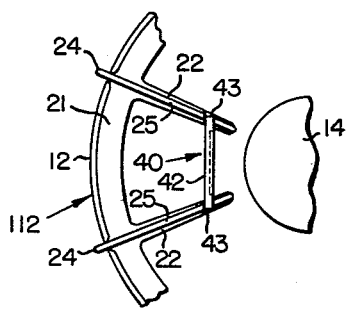
FIG. 6 is a fragmentary plan view of the gas burner and grid and showing a further modified form of flame shield mounted on the grid.
Figure 7:
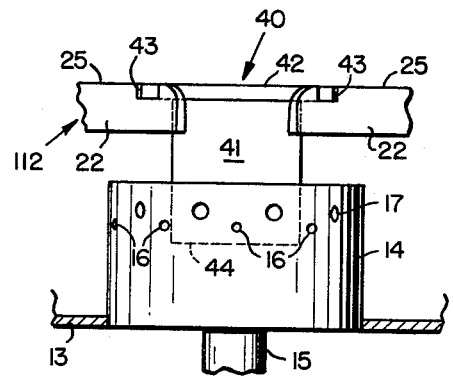
FIG. 7 is an enlarged side elevation of this embodiment looking at the left of FIG. 6.

In the modification shown in FIGS. 6 and 7, the shield 40 is adapted to be employed with a grid 112 which is similar to grid 111, except that a pair of adjacent grid ribs 22 are notched along their upper surfaces 25 to provide therein a pair of aligned grooves 43. The shield 40 comprises a rectangular plate 41 which has a rigid bar or rod 42 secured to its upper edge. Opposite ends of bar 42 project beyond the opposite sides of plate 41 and are adapted to be removably seated in the aligned grooves 43 formed in the upper faces of the pair of supporting ribs 22. When plate 41 is suspended from the ribs 22 as shown in FIG. 7, the upper surface of bar 42 is coplanar with the upper surfaces 25 of the two supporting ribs 22; and the lower edge 44 of the plate is positioned between the gas burner openings 16 and the bottom 13 of the burner housing. Also, the plate 41 is spaced from the periphery of burner 14, whereby flames issuing from those openings 16 and 17, that are opposite plate 41, will impinge upon the latter.

Figure 8:
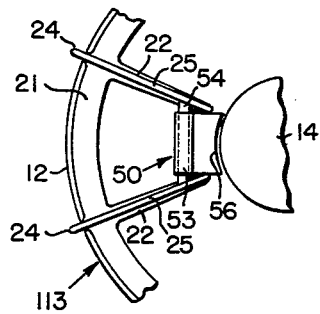
FIG. 8 is a fragmentary plan view of a still further embodiment of this invention.
Figure 9:
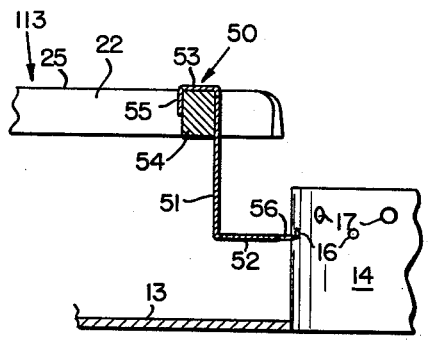
FIG. 9 is an enlarged, front elevation of the embodiment shown in FIG. 8, certain of the parts being shown in section.

In the embodiment shown in FIGS. 8 and 9, the shield 50 is adapted to be employed with a grid 113, which is similar to grid 111, except that a transverse rib or bar 54 is secured to and extends between the confronting sides of a pair of adjacent grid ribs 22 adjacent the inner ends thereof. Shield 50 comprises a generally rectangular plate 51 having at its lower end a lateral flange 52 which extends inwardly, and has at its upper end a lateral flange 53 which extends outwardly. Flange 53 is adapted to seat removably upon the upper surface of the transverse bar 54 of grid 113, thereby to suspend plate 51 between the two grid ribs 22 with its flange 52 facing burner 14 between the burner openings 16 and the housing bottom 13.

Adjacent its marginal edge flange 53 is bent downwardly to form an integral lip 55 which is adapted to overlie the outer side of the transverse rib 54. Preferably rib 54 is rectangular in cross section, and plate 51, flange 53 and lip 55 are disposed at right angles to one another so that they fit snugly on rib 54 to prevent any undesirable pivoting of plate 51 about its upper end. The inner marginal edge 56 of flange 52 is concave in configuration so that it conforms to and may be positioned against the annular wall of burner 14 intermediate the burner openings 16 and the housing bottom 13. Flames emitted from the openings 16 and 17 in the burner 14 opposite plate 51 tend to impinge upon the latter in a manner similar to that described with respect to shields 26, 30 and 40. Moreover, flange 52 prevents any of such flames from passing beneath the lower edge of plate 51.

Figure 10:
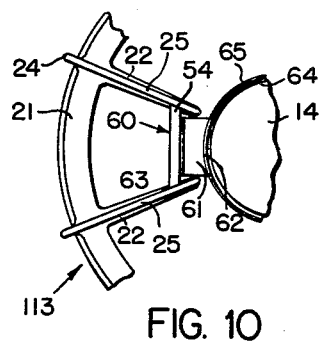
FIG. 10 is a fragmentary plan view of an even further embodiment.
Figure 11:
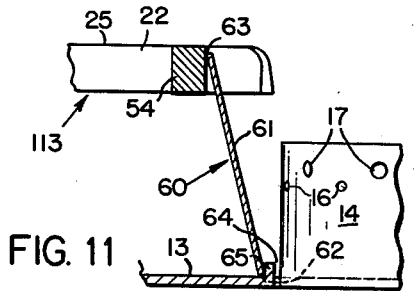
FIG. 11 is an enlarged front elevation of this embodiment, certain of the parts being shown in section.

FIGS. 10 and 11 illustrate a still further embodiment of the invention comprising a modified shield 60 which is adapted to be employed with the grid 113 in lieu of the shield 50 shown in FIGS. 8 and 9. Shield 60 is in the form of a plane, rectangularly shaped plate 61 having a concavedly shaped lower edge 62 and a straight upper edge 63. Around the bottom of burner 14 the housing bottom 13 is provided with an annular flange 65 which is radially spaced as at 64 from the burner. This is a conventional feature which permits spilled fluids to drain out of housing 12; and it may be utilized in any of the preceding embodiments if desired. Plate 61 is adapted to be mounted in housing 12 with its lower edge 62 resting against the annular flange 65; and with its upper edge 63 leaning against and engaging the transverse bar 54 which is secured to and extends between two of the ribs 22 of a grid 113. Plate 61 extends across the space between the two last-named grid ribs, and from its upper edge 63 inclines downwardly and inwardly toward the bottom of cylinder 14. Flames directed outwardly from the burner holes 16 and 17, strike the inclined plate 61 and are prevented from passing through the space between the last-named ribs 22.

From the foregoing it will be apparent that the applicant has employed a relatively simple and inexpensive device for solving a problem of long standing. With applicant's novel grid and shield, overheating of a pan handle is substantially eliminated, thereby avoiding burns or other accidents which might otherwise result during the use of prior grids, and making the handle last as long as the pan. When one of applicant's movable shields 30, 40, 50 or 60 is employed, it is possible to shift the shield angularly relative to the gas burner to different positions between any two grid ribs, so that the angular position of the pan handle 28 relative to a respective burner 14 may be shifted and still be protected.

Another advantage of applicant's device is that the gas from burner 14 can be turned on full without having to worry about damage to the handles of even the smallest of pans; even though the gas pressure may be so great as to cause the flames to extend almost straight out from the side of the burner. Applicant's construction has a further advantage for stoves serviced by a public utility company rather than those fed by bottled propane gas or the like, for even though the gas pressure may differ materially over a short period of time, applicant's shields will confine the flame and prevent any undesirable heating of a pan handle if the gas pressure is turned too high or unexpectedly increases while the pan is unattended on the stove.

While the shields herein are illustrated as being mounted immediately adjacent the radially innermost ends of the grid ribs, it is to be understood that they could be designed to be positioned at a greater radial distance beyond the outer peripheral surface of burner 14 if desired. For instance, bar 42 could be positioned at a greater radial distance beyond the outer peripheral surface of burner 14 if desired. For instance, bar 42 could be made greater in length, the shield could be made correspondingly wider, and further aligned notches 43 could be formed in the supporting ribs 22 at points radially spaced further outwardly along the ribs so that plates 41 could be radially spaced further outwardly from burner 14. Moreover, provided that their lower edges extend at least below the curtain of flame, the shields may be made to touch the housing bottom 13 as in FIGS. 4 and 5, or may be spaced thereabove as in FIGS. 1 to 3.

While the invention has been described in connection with several different embodiments thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In a gas stove the combination with a gas burner of the type which directs a curtain of flame radially outwardly, of
   (a) an annular member surrounding said burner,
   (b) a grid mounted on said member and having a plurality of angularly spaced, radially projecting rigid ribs, said ribs being positioned above said burner and having coplanar upper surfaces for supporting a pan over said burner, and
   (c) a flame shield for preventing undesirable heating of the handle of said pan, said shield partially surrounding said burner and extending downwardly from at least one of said ribs between said annular member and burner and having an inner face radially spaced from and confronting a portion of said burner, and which projects downwardly below said curtain of flame and deflects the part of said curtain of flame which impinges thereon, thereby to block the radially outward flow of that portion of said curtain of flame from said burner portion.

2. In a gas stove the combination as defined in claim 1, wherein said shield comprises
   (a) an arcuate plate secured to and extending transversely between said one rib and an adjacent rib,
   (b) said inner face is the concave surface of said arcuate plate, and
   (c) the upper edge of said plate is positioned coplanar with the upper surfaces of said ribs.

3. In a gas stove the combination as defined in claim 1 wherein said shield comprises
   (a) a rectangular member having an integral flange extending rearwardly from its upper edge thereof and extending laterally beyond opposite ends of said edge, and wherein
   (b) at least part of the extended portions of said flange are removably seated on the upper surfaces of said one rib and an adjacent rib to suspend said rectangular member therebetween and
   (c) further parts of said extended portions are folded downwardly over the remote sides of said one and said adjacent ribs to stabilize said rectangular member thereon, and to prevent said member from falling off the last-named ribs, when it is engaged by said flame.

4. In a gas stove the combination as defined in claim 1 wherein
   (a) an integral bar extends transversely between said one rib and an adjacent rib, and said shield comprises
   (b) a rectangular member having a lateral flange along one side thereof which is removably seated on said bar to suspend said rectangular member between the last-named ribs, and
   (c) a further, lateral flange integral with the opposite edge of said rectangular member and having a concave edge which abuts the exterior surface of said burner below the level of said curtain of flame.

5. In a gas stove the combination as defined in claim 1 wherein
   (a) said one rib and an adjacent rib have at least two, aligned, transverse grooves in their upper surfaces, and said shield comprises
   (b) a rectangular member having a rigid bar integral with one edge thereof and extending beyond opposite ends of said edge, and
   (c) said bar has opposite ends thereof removably seated in said grooves to suspend said rectangular member between the last-named ribs.

6. In a gas stove the combination as defined in claim 1 wherein said shield comprises
   (a) a rectangular member having a concave lower edge and a straight upper edge, and
   (b) an integral bar extends transversely between said one rib and an adjacent rib and is radially spaced outwardly from said burner, said concave edge being engageable with said burner below said curtain of flame and said bar being engageable with said upper edge to support said rectangular member in a plane inclined to the axis of said annular member.

7. The combination comprising
   (a) a hollow, generally cylindrical gas burner having a plurality of circumferentially aligned openings in its annular wall for directing gas radially outwardly,
   (b) an annular housing surrounding said burner coaxially thereof,
   (c) a rigid ring member removably seated in one end of said housing coaxially thereof,
   (d) a plurality of rigid ribs secured adjacent one end thereof to said ring member at angularly spaced points about its axis and extending radially inwardly from said firing member and over the top of said burner, and
   (e) a flame shield for preventing undesirable heating of the handle of said pan, said shield partially surrounding said burner and extending downwardly between at least two of said ribs and into the radial space between said annular member and said burner, and below said openings in said burner, said shield having an inner face confronting the openings in a portion of said burner thereby to interrupt the radially outward flow of the portion of the curtain of flame from that portion of said burner.

8. The combination as defined in claim 7 wherein
   (a) said shield has a lateral flange integral with one edge thereof, and
   (b) said flange extends beyond opposite ends of said one edge, and
   (c) opposite ends of said flange are removably seated, respectively, on one of said two ribs to hold said shield thereon against the action of said gas.

9. The combination as defined in claim 7 wherein
   (a) a rigid bar is secured to and extends transversely between said two ribs, and said shield has
   (b) a first flange extending rearwardly from its upper edge and removably seated on said bar, and
   (c) a second flange extending forwardly from its lower edge, said second flange having a concavedly shaped terminal edge which conforms to and engages said annular wall of said burner below the openings therein.

10. The combination as defined in claim 7 wherein
    (a) said two ribs have aligned, transverse, grooves in their respective upper surfaces, and
    (b) a rigid bar is integral with the upper edge of said shield and has opposite ends thereof removably seated in said grooves.

11. The combination as defined in claim 7 wherein
    (a) said shield extends transversely across the space between said two ribs, (b) said inner face of said shield is concave and disposed in radially spaced concentric relation to said annular burner wall, and
(c) the outer face of said shield is secured to the radially innermost ends of said two ribs.

12. The combination as claimed in claim 7 wherein
(a) a rigid bar is secured to and extends transversely between said two ribs, and
(b) said shield has a straight upper edge and a concave lower edge resting, respectively, against said bar and adjacent the annular wall of said burner below the openings therein, whereby said shield is removably supported in a plane inclined to the axis of the burner.

References Cited by the Examiner
UNITED STATES PATENTS

| 1,366,365 | 1/21 | Donnelly | 127—214 |
| 1,546,919 | 7/25 | Dore | 126—214 |

FOREIGN PATENTS

| 186,791 | 10/06 | Germany. |

JAMES W. WESTHAVER, *Primary Examiner*.